March 2, 1943.                J. H. MILLER                2,312,990
                     ELECTRICAL MEASURING INSTRUMENT
                       Filed Nov. 26, 1938          2 Sheets-Sheet 1
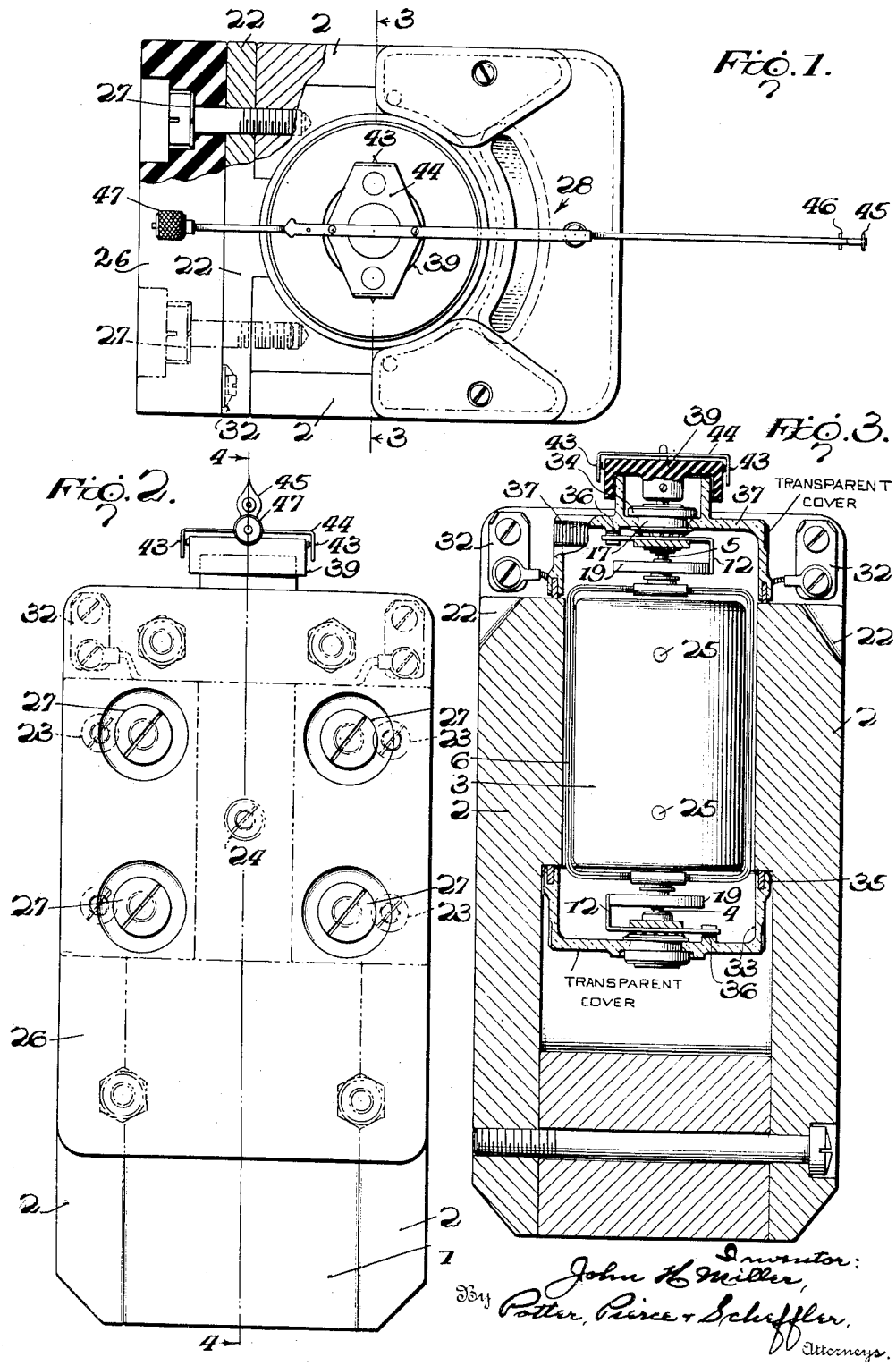

March 2, 1943.   J. H. MILLER   2,312,990
ELECTRICAL MEASURING INSTRUMENT
Filed Nov. 26, 1938   2 Sheets-Sheet 2
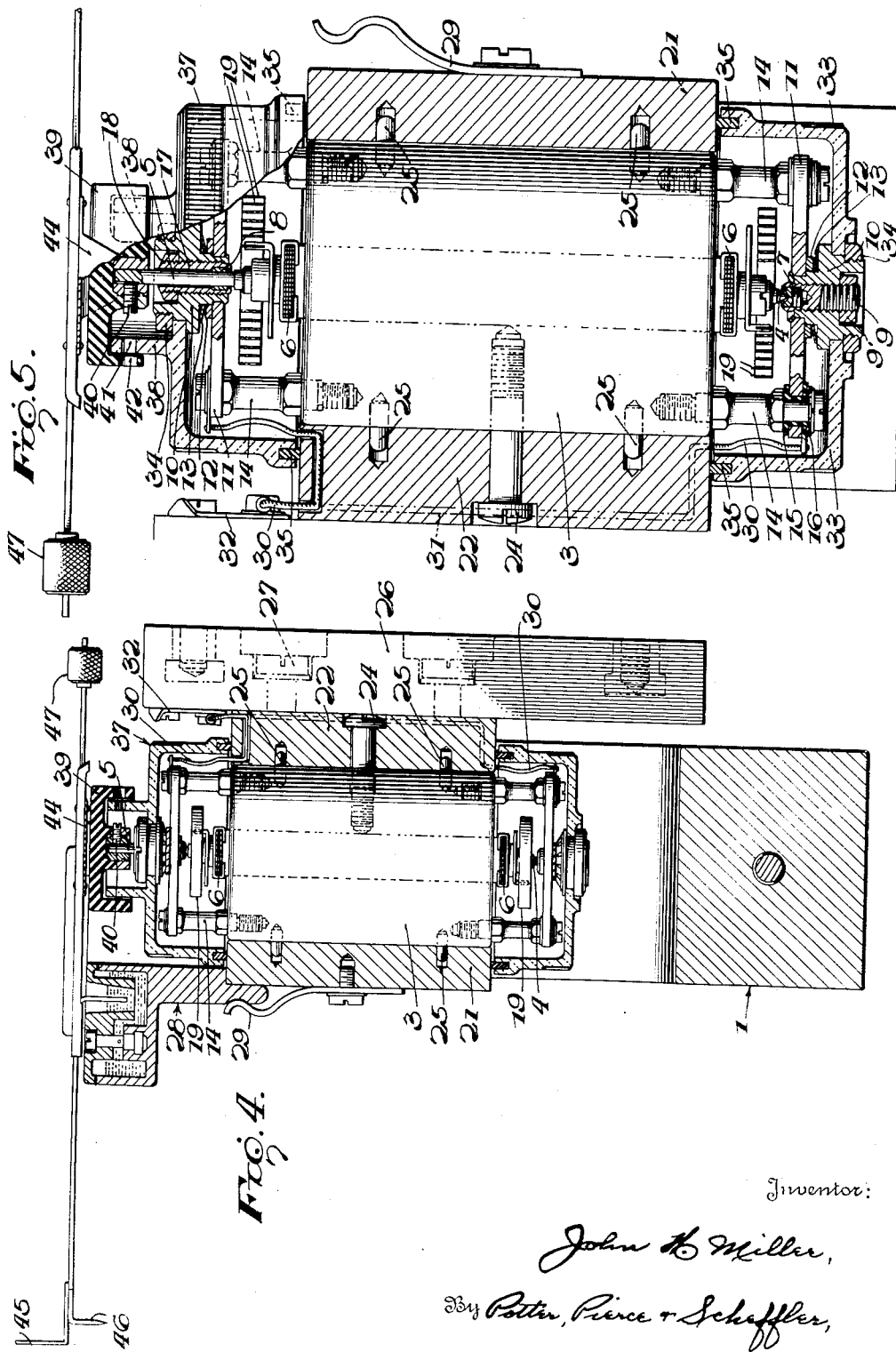

Patented Mar. 2, 1943

2,312,990

UNITED STATES PATENT OFFICE 2,312,990

ELECTRICAL MEASURING INSTRUMENT

John H. Miller, Short Hills, N. J., assignor to Weston Electrical Instrument Corporation, Newark, N. J., a corporation of New Jersey Application November 26, 1938, Serial No. 242,581

15 Claims. (Cl. 171—95)

This invention relates to improvements in electrical measuring instruments and more particularly to that class of instruments which are used in combination with a chart and pen for the recording of any magnitude measurable by a variation of current.

Direct writing recorders, of this class, having the pen or stylus operated directly by the movable coil are more or less of conventional construction and are extensively employed in industry. A moving element pivotally supported between bridge structures and rotatable in the field of a permanent magnet, and having a combination pointer and pen mechanically attached thereto is usually located in the back part of the instrument case. The pointer tip and pen extend forward, the latter riding on a chart which is driven by a suitable mechanism located in the front part of the case.

For obvious protection of the various elements the entire recorder is housed in a covered case. However, the cover of the case must necessarily be opened quite frequently for removal and replacement of the chart, cleaning of the pen, refilling the ink reservoir and general servicing. During such times a certain amount of dust and dirt finds its way into the instrument case and eventually into the actuating movement proper. This is particularly bad in the steel industry where much of the dirt is ferrous material which in time finds its way into the air gap of the moving system causing friction and associated difficulties.

An object of this invention is to provide electrical measuring instruments having simple and effective arrangements for sealing off the moving systems of the instruments. An object is to provide electrical instruments of the permanent magnet, moving coil type which include novel structures for supporting the moving coil, the supporting structures being of relatively small size to facilitate the enclosure of the moving coil system and its supports. A further object is to provide an electrical measuring instrument of the permanent magnet, moving coil type which has members spanning the pole pieces to seal off the sides of the interpolar air gap, and closures at each end of the moving coil to complete a dustproof enclosure for the moving coil, its bearings and the air gap in which it moves. More specifically, an object is to provide an electrical measuring instrument for actuating the pointer and pen of a recorder, the instrument having a moving system carrying a staff for actuating the recorder pen, devices including a closure through which the staff extends for sealing off the moving coil, and a cap of insulating material secured to the staff and serving as a support for the recorder pen. Other objects are to provide electrical measuring instruments in which closures are arranged at each end of the moving coil system to form seals for the bearings of the moving coil system, and the restoring springs of the moving coil are anchored to one or both of the closures to permit adjustment of the instrument zero by rotating the closures without breaking the seals. Further objects of the invention are to provide instruments of the permanent magnet, core and pivotally mounted coil type in which the supports for the moving coil bearings are mounted on the core and, preferably, do not extend beyond the space defined by extensions of the cylindrical surface of the core.

These and other objects and advantages of the invention will be apparent from the following specification when taken with the accompanying drawings in which:

Fig. 1 is a plan view of an electrical measuring instrument embodying the invention;

Fig. 2 is a rear elevation of the instrument;

Fig. 3 is a sectional view of the instrument substantially on line 3—3 of Fig. 1;

Fig. 4 is a sectional view of the instrument substantially on line 4—4 of Fig. 2; and Fig. 5 is an enlarged fragmentary cross sectional view similar to Fig. 4, but viewed from the opposite side of the plane indicated by line 4—4 of Fig. 2.

The illustrated embodiment of this invention comprises a movable coil with associated springs, pivots and bearings, supported by an upper and lower bridge structure and rotatable in the field of a permanent magnet. Novel means are provided for supporting the movable coil and for attaching the pointer and pen thereto.

The magnetic system consists of a permanent magnet 1 of high coercive steel, pole pieces 2 having arcuate faces defining a cylindrical bore, and a cylindrical core 3 mounted in the interpole space in the conventional manner. The lower pivot 4 and an upper staff 5 form an axis about which movable coil 6 may rotate in bearings 7 and 8. Bearing 7 is embedded in the bearing screw 9 which is threaded into collar 10 and locked in position by the nut 9'. The collar 10 is firmly swaged to the lower bridge 11 and holds the coil spring strap 12 in frictional engagement with the bridge under the action of spring washer 13. The bridge 11 is mounted and located by bridge supports 14 which are threaded into the core 3, being electrically insulated therefrom by insulator bushing 15 and washer 16.

Bearing 8 is embedded in the threaded bearing screw 17 which is in turn threaded into the collar 10 that is firmly swaged to the upper bridge 11 and frictionally holds the upper coil spring strap in place by spring washer 13. Nut 18 serves to lock bearing screw 17 into position. The upper bridge 11 is mounted on, supported and insulated from the core 3 by supports 14 similar to those of the lower bridge 11. Springs 19 are of the conventional type and are connected between the coil 6 and the straps 12 to provide a restoring torque for returning the movable coil 6 to its normal position upon removal of the actuating current.

The front and back plates 21, 22 of non-magnetic material are secured to the pole pieces 2 by screws 23 and the core 3 is secured to the plates by screw 24 and is accurately located by dowel pins 25. The upper and lower faces of the plates 21, 22 are flush with the corresponding faces of the portions of the pole pieces 2 that partially enclose the core 3. The entire actuating mechanism is supported on base 26 by screws 27 that extend into the back plate 22. The ink reservoir 28 rests upon the front plate 21 and is yieldingly held in position by a spring clip 29. The coil leads 30 extend from lugs on the bridges 11, through grooves 31 in the back plate 22, to terminals 32 on the supporting base 26.

The described mounting of the bridges on the core 3 permits the substantially complete sealing of the entire actuating mechanism against dust and grit when the recorder casing is opened. The lower sealing member is a cap 33 of cup-shape including a cylindrical rim and an end having a central opening which permits the cap to seat on a flange on the lower collar 10, the cap being secured in place by a nut 34 threaded on the collar. A gasket or ring 35 of resilient material is pressed against the lower faces of the pole pieces and plates 21, 22 by the rim of the cap 33 and, preferably, this sealing ring is seated in an annular groove in the rim of the cap. A forked lug 36 embraces the end of the strap 12 to which the lower coil spring 19 is anchored, see Fig. 3, and the angular position of the coil spring may thus be adjusted by turning the cap 33.

The upper sealing cap 37 is similar to the cap 33 but has an upwardly extending cylindrical flange or sleeve 38 that surrounds the upper end of shaft 5. Cap 37 is secured to the upper collar 10 by a nut 34, carries a sealing ring 35 of resilient material, and has a forked lug 36 engaging the end of the upper spring strap 12. Caps 33 and 37 are held firmly to the associated collars 10 to establish a good sealing pressure at the resilient rings 35 but are sufficiently free to be rotated a reasonable distance for adjustment of the zero position of the instrument. The edges of the caps 33, 37 are milled to facilitate the manual adjustment of the instrument zero.

A cap 39 of suitable insulating material is attached to the staff 5 by set screw 40 and has a depending flange that closely surrounds the flange 37 of the sealing cap 36. The set screw 40 is tightened by means of a screw driver inserted through cooperating holes 41 and 42 in caps 39 and 36, respectively. Cap 39 is provided with two diametrically opposed pins 43 which form an axis for stirrup 44, and the instrument pointer 45 and pen 46 are affixed to stirrup 44 in any suitable manner. Stirrup 44 being free to rotate about the axis formed by pins 43 permits rocking movement of the entire pen and pointer system in the plane that includes that system and the axis of the staff 5. A balance nut 47 is adjustable on the extension of the pen shaft for regulation of the pressure of the pen upon the recorder chart.

The caps 33, 36 and 39 are of insulating material and preferably of transparent material to permit inspection of the moving coil assembly without breaking the sealing joints. Celluloid or a methyl methacrylate molding material such as that sold under the trade-mark "Lucite" are appropriate plastic molding materials for forming the caps.

It can be seen that the entire upper section of the actuation mechanism is completely sealed in except for the minute clearance between staff 5 and bearing 8. This practically negligible clearance is an effective trap against dust, dirt, etc. However, the flange 41 and cap 39 interposed over the extended cylindrical section 37 of sealing cap 36 provide an additional safeguard in that the commercially feasible clearance between the two caps can be limited to a very small value. The top cap 39 being made of insulating material, also serves to give a high electrical insulation between the pen, (which may be considered at ground potential) and the electrical circuit of the moving system.

The described embodiment of the invention is adapted for use in a recording apparatus but it will be apparent that certain features of the invention may be used to advantage in other measuring instruments and instrument type relays. The mounting of the bridges on the core member provides a compact construction that may be incorporated in small instruments or relays where the sealing covers are not essential and, in instrument relays, the contact arm may be mounted on the staff at the exterior of the upper closure cap or, alternatively, within the closure cap.

There is considerable latitude in the design and construction of electrical instruments conforming to this invention and it is to be understood that many variations that occur to those skilled in the art fall within the spirit of this invention as set forth in the following claims.

I claim:

1. In an electrical measuring instrument, the combination with a magnetic field system including spaced pole pieces and a cylindrical core between the same, a coil, and bearings supporting said coil for pivotal movement in the gaps between said core and said pole pieces, of means sealing said coil and bearings against dust and dirt, said sealing means comprising filler members engaging said spaced pole pieces to close the edges of the gap between the same and cover members supported by the respective bearings over the ends of the gap and having sealing engagement with the surface of the pole pieces and with the filler members adjacent the ends of the gaps.

2. In an electrical measuring instrument, a permanent magnet structure having spaced polar surfaces, front and back mounting plates spanning the polar surfaces, a core supported by said plates between said polar surfaces, a coil and bearings supporting the same for pivotal movement in the gaps between said core and said polar surfaces, and sealing means for said core and bearings, said sealing means including covers housing the respective bearings and seated against said magnetic structure and the mounting plates.

3. In an electrical instrument, a permanent magnet having spaced pole pieces, front and back mounting plates laterally spanning the pole pieces, a core between said pole pieces, a coil surrounding said core, bearings supporting said coil, and means sealing the movable coil; said means comprising covers of cup-shape with cylindrical rims over the respective bearings, a ring of resilient material partially embedded in the rim of each cover, and means for securing said covers to their respective bearings to press the resilient ring of each cover against the adjacent surfaces of the pole pieces and mounting plates.

4. In an electrical measuring instrument, the invention as claimed in claim 3, wherein each bearing has an externally threaded collar, each cover has an opening for fitting the cover over the associated bearing collar, and a nut is threaded on each collar to secure the cover to its associated bearing.

5. In an electrical measuring instrument, a permanent magnet structure including spaced pole pieces having cylindrical polar surfaces, mounting plates spanning said pole pieces, a core mounted on said plates and positioned between said pole pieces, a coil surrounding said core, bearing means supporting said coil for pivotal movement, and means for sealing off said coil and bearing means; said sealing means including a cover for each bearing means, and means securing each cover to its bearing means and pressing the cover into sealing engagement with the adjacent surfaces of the pole pieces and mounting plates.

6. An electrical instrument comprising a permanent magnet, a core supported by said magnet, a movable coil, coil bearings, means including a plurality of posts mounted upon said core for supporting said bearings, and means including covers extending about the respective bearings and in sealing engagement with the surface of said magnet adjacent said core to seal off said core, coil and bearings from the space about said magnet.

7. An electrical instrument comprising a permanent magnet, a movable coil and bearings supporting said coil for pivotal movement, bearing supports, restoring springs secured to said coil and to abutments, and caps enclosing each bearing support, one of said caps having an inwardly directed extension engaging the associated spring abutment whereby angular adjustment of that cap adjusts the zero position of the instrument.

8. In an electrical instrument, a permanent magnet structure, a movable coil, restoring springs secured to said coil and to abutments, upper and lower bearing supports for said coil, sealing caps enclosing said bearings and loosely secured thereto, and means for mechanically altering the normal position of the movable coil, said means comprising a lug extending inwardly from each cap to engage the associated abutment of a restoring spring.

9. In an electrical measuring instrument, the invention as claimed in claim 8, wherein each bearing support includes a threaded collar, the sealing caps have openings for fitting the same over the associated threaded collar, and a nut is threaded on the collar to secure the cap loosely to the collar to permit manual adjustment of the caps angularly with respect to the associated collar.

10. An electrical measuring instrument including a permanent magnet structure having spaced pole pieces, a coil movable in the gap between said pole pieces, a staff extending from said coil, a cap member secured to said staff, a pointer, and means mounting said pointer on said cap member for rocking movement of the pointer in the plane defined by the axis of the pointer and the axis of the staff.

11. An electrical measuring instrument including a permanent magnet structure having spaced pole pieces, a coil movable in the gap between said pole pieces, bearings supporting said coil, sealing closures for said bearings, a staff extending from said coil and through one bearing and the associated closure, said associated closure having a cylindrical extension surrounding the staff, a cap secured to said staff and having a flange surrounding said cylindrical extension, a pointer, and means attaching said pointer to said cap.

12. An electrical measuring instrument as claimed in claim 11, wherein said attaching means comprises a pair of diametrically opposed pins on said cap, a stirrup pivotally supported on said pins, and means for mounting said pointer on said stirrup.

13. An electrical instrument comprising a permanent magnet structure including pole pieces defining a cylindrical air gap, a core within said gap, means attached to said permanent magnet structure to close the edges of said gap, a coil and means mounting the same for pivotal movement about said core, and closures extending over said mounting means and having sealing engagement with the surfaces of said pole pieces and said closing means adjacent said mounting means to enclose the ends of the air gap and to seal off said mounting means from the space about said magnet.

14. An electrical instrument as claimed in claim 13, wherein said closures are mounted on the mounting means of said coil.

15. In an electrical instrument, the combination with a permanent magnet having pole pieces, a core between said pole pieces, a coil, and bearings supporting said coil for pivotal movement about said core, at least one of said bearings having a threaded collar extending beyond a radial flange, of means forming a seal for the flanged bearing, said means comprising a cupped closure having a rim for sealing engagement with said pole pieces and a central opening for fitting said closure over the threaded collar, and a nut threaded on said collar to secure said cupped closure to that bearing.

JOHN H. MILLER.